Figure 1:
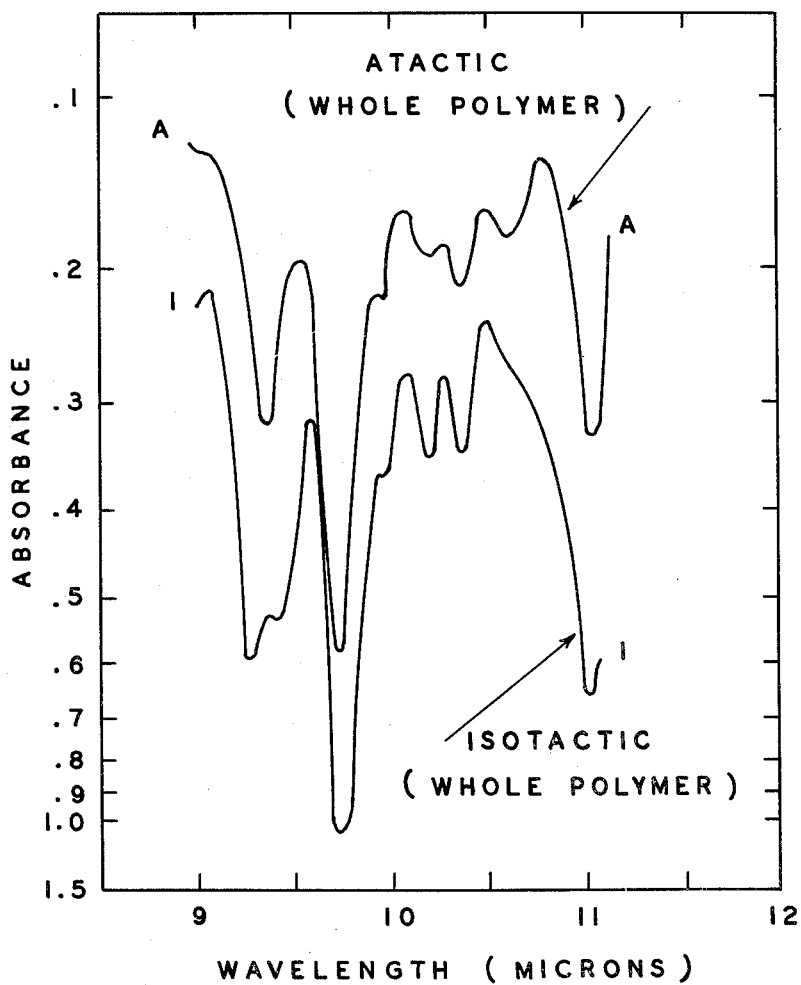

— FIG. 1 —

ROBERT A. ISAKSEN
MYER EZRIN
SEYMOUR NEWMAN
ROLF BUCHDAHL     INVENTORS.

BY Cornelius H. Meary
ATTORNEY.

2,997,743
BIAXIALLY ORIENTED CRYSTALLINE POLYSTYRENE

Robert A. Isaksen, Chicopee Falls, Myer Ezrin and Seymour Newman, Springfield, and Rolf Buchdahl, Longmeadow, Mass., assignors to Monsanto Chemical Company, St. Louis, Mo., a corporation of Delaware
Filed Sept. 28, 1959, Ser. No. 842,722
8 Claims. (Cl. 18—48)

The present invention relates to the production of films and more particularly to the production of biaxially oriented crystalline polystyrene films exhibiting improved tensile strength.

Conventional polystyrene, hereinafter referred to as atactic polystyrene, is characterized by an amorphous, non-crystallizable nature, and is soluble in many common organic solvents such as benzene, naphtha, carbon tetrachloride and the like. While it has been proposed that atactic polystyrene can be stretch-oriented into films, the products which result remain amorphous, as well as soluble in common organic solvents. Additionally, it has been determined that films stretch-oriented from atactic polystyrene retract or lose this orientation when the films are subjected to temperatures in excess of 90° C. Consequently, these films have little utility in high temperature applications.

Accordingly, it is the principal object of the present invention to provide biaxially oriented polystyrene films adapted for high temperature usages.

Another object of this invention is to provide a process by which to produce biaxially oriented polystyrene films exhibiting improved tensile strength.

These and other objects of the invention are attained in a method for producing biaxially oriented crystalline polystyrene films which are essentially insoluble in common organic solvents under room conditions and retain orientation up to about 200° C. which comprises simultaneously biaxially stretching a starting member or film constituting amorphous isotactic polystyrene having a viscosity average molecular weight of greater than about 200,000 and a number average molecular weight of greater than about 50,000 to the extent of 400–700% of the original axes distances (original length and width of said member) at a rate of 2,000–40,000% per minute and under a temperature ranging 115–140° C., and thereafter annealing said member at a temperature of 175–185° C. for a finite period up to 60 minutes while maintaining biaxial stretched extension.

The following examples are provided in illustration of the present invention. Where parts are mentioned, parts by weight are intended unless otherwise specified.

EXAMPLE I

Ninety-nine parts of styrene monomer and one part of triethylaluminum-titanium tetrachloride catalyst are charged into a reaction kettle. The molar ratio of triethyl aluminum to titanium tetrachloride in the catalyst is about 3.0:1.0. The vessel is raised to a temperature of 65–75° C. and maintained at this temperature until 20% conversion of the monomer charge takes place.

Methanol containing 1.0% hydrochloric acid, is then added to react with the catalyst. This serves to terminate the polymerization reaction. The polymer, which is in solid form, is filtered and washed in a Buchner funnel with methanol until a colorless filtrate results.

The product then remaining is extracted for 20 hours with methyl ethyl ketone using a Soxhlet extractor. Thereafter, the solid polymer is removed from the extractor and dried under 1 mm./Hg and 110–120° C. to constant weight.

A 20 gram sample of the product is again extracted for 20 hours in a Soxhlet extractor with methyl ethyl ketone. The sample does not suffer any loss in weight, indicating that the product constitutes 100% isotactic polystyrene.

The granular isotactic polystyrene polymer product is determined to have a viscosity average molecular weight of 4 million as inferred from the intrinsic viscosity of a solution of the same measured in o-dichlorobenzene containing 0.2–0.3 part per 100 parts of ditertiary butyl p-cresol at 25.0° C.±0.02° C. Solvation of the isotactic polystyrene in the o-dichlorobenzene is facilitated by the use of temperatures of 170–175° C. together with shaking for about 15 minutes. The number average molecular weight of the isotactic polystyrene product is 400,000 as determined from osmotic pressure measurements.

Prior to stretching, the granular isotactic polystyrene is formed into a film by a double extrusion operation. In the first of these the granular product is heated to equilibrium temperature at 285–290° C., and extruded in a number of square strands. These strands are directed through a chopper to provide 0.125 inch cubes or pellets of isotactic polystyrene. The pelletized material is then charged into the second extruder, heated again to equilibrium at 285–290° C. and directed through a sheet die head fitted on the extruder. The film or sheet which results is 7 inches in width and 0.1 inch (100 mils) thick. The film is allowed to cool to room temperature, in effect air-quenching the same. The cooled film of crystallizable polystyrene has a density of 1.055 indicating that it is essentially amorphous.

A. *Simultaneously biaxially stretched films.*—Sections of the film, 7 inches x 7 inches in area are clamped at four sides in a hydraulic lazy-tongs-type cross-stretcher, then brought to a temperature of 125° C. and biaxially stretched (along both the longitudinal and transversal axes) 600% of the initial axes distances in a time interval of 6 seconds (6,000% per minute rate). The biaxially stretch-oriented film sections which now have a planar dimension of 42 inches x 42 inches and 2 mils in thickness are cooled rapidly to room temperature. On being tested, the film sections evidence densities of 1.054, indicating that it is effectively amorphous. After being cooled, the biaxially oriented film sections are self-supporting over their stretched areas. These film sections will be referred to as Films 1–A–U.

B. *Annealed biaxially stretched films.*—One-half the number of biaxially stretched polystyrene film sections prepared under A above are annealed by retaining them under full biaxial tension, that is, to their full stretched extension, in the cross-stretcher at a temperature of 180° C., for a period of 60 minutes after reaching temperature equilibrium. Thereafter the film sections are removed from the cross-stretcher and allowed to cool to room temperature. These are clear, transparent and glossy in appearance. For convenience they will be referred to as Films 1–B–A.

EXAMPLE II

A portion of the granular isotactic polystyrene product of Example I is degraded to a viscosity average molecular weight of 150,000 and a number average molecular weight of 30,000 by subjecting the same to a temperature of 280° C. for 80 minutes. This material is formed into a film 7 inches in width and 0.1 inch thick in the manner previously described. The film has a density of 1.054 indicating the polystyrene is amorphous in nature.

Sections of this film are stretch-oriented in the manner of Example I–A to produce simultaneously biaxially stretched film section. An equal number of the film sections are retained as stretched, without annealing. These will be designated as Films II-A-U.

The remainder of the biaxially stretch-oriented film sections are annealed in the manner of Example 1-B. The resulting sections are rough and opaque in appearance. These will be referred to as films II-B-A.

EXAMPLE III

The polymerization reaction of Example I is repeated as to reactants and conditions. After removal from the reactor the polymer product is filtered and washed in a Buchner funnel with a volume of methanol containing 1% hydrochloric acid to obtain a colorless filtrate. After removal from the funnel the product is refluxed in methyl ethyl ketone for 5 hours at atmospheric conditions. The product is again filtered and washed with methyl ethyl ketone, and following that is dried under 1 mm./Hg and 110-120° C. to constant weight to provide a granular product.

A 20 gram sample of the granular product is extracted for 20 hours in a Soxhlet extractor with methyl ethyl ketone. The loss of 1 gram of the sample indicates the original granular product contains 5% atactic polystyrene and 95% isotactic polystyrene.

A portion of the original product is formed into film using the extrusion apparatus and conditions set forth in Example I.

Sections of the film are stretch-oriented in the manner of Example I-A to produce biaxially stretched film sections. Half of these are retained as stretched, without being annealed, and will be designated as films III-A-U.

The remaining number of biaxially stretched film sections are annealed in the manner of Example I-B. These film sections are rough and opaque. Reference will be made to them as films III-B-A.

EXAMPLE IV

A reaction vessel is charged with 99.9 parts by weight of styrene monomer and 0.1 part by weight of ditertiary butyl peroxide. The temperature of the vessel is raised to 100° C. and maintained for a period of 40 hours. The polystyrene product is removed as a solid from the reaction vessel and granulated by crushing. This material is determined to be atactic polystyrene.

The granular atactic polystyrene is pelletized into 0.125 inch cubes by first extruding strands of same at an extrusion temperature of 260-280° C. followed by chopping the same. A film is formed from the pelletized atactic material which is 0.1 inch in thickness and 7 inches in width. The extrusion temperature for this is again 260-280° C. The film, after being cooled to room temperature, is noted to have a density of 1.045, attesting to its being amorphous.

Square sections of the film are brought up to a temperature of 110° C. in the cross-stretcher, and while so maintained are biaxially stretched 600% of their original axes distance in 6 seconds. One-half, in number, of the biaxially stretched sections are maintained under full biaxial tension, and cooled to room temperature with a blast of air refrigerated to 0° C. Tension is then relieved. These sections will be designated as films IV-A-U. The remainder of the stretched sections are annealed in the manner of Example I-B. These sections will be referred to as films IV-B-A.

*Testing procedures—product*

Specimens of each of the film sections provided in Examples I-IV are tested in accordance with the following test procedures.

(a) Density/ASTM D1505-57T
(b) Yield stress ⎫
    Fail stress
    Yield elongation ⎬ ASTM D638-58T
    Fail elongation
    Young's modulus ⎭
(c) MIT fold endurance/ASTM D643-43
(d) Dielectric constant ⎫ ASTM D150-54T
    Dissipation factor ⎭
(e) Melting point: Using 450× polarizing microscope.
(f) Solvent resistance: Specimens 1" x 1" x 0.010 are placed in 100 ml. of reagent grade benzene at S.T.P. Every 5 minutes the samples are removed with tweezers and visually inspected for swelling and relaxation or dimensional shrinkage. Time reported refers then to first evidence of swelling.
(g) Thermal dimensional stability: Specimens 0.5" x 2" x 0.010" are clamped in an oven in a perpendicular planar position at 200° C. and loaded (weights hung from the bottom of the specimen) to 820 p.s.i. The distance between clamps is measured with a cathetometer immediately of securing the specimens in the oven. After 10 minutes, the distance between clamps is again measured and changes noted. The results of the foregoing tests are as follows:

TABLE I

| Test | Film specimens/results | | | | | | | |
|---|---|---|---|---|---|---|---|---|
| | I-A-U | I-B-A | II-A-U | II-B-A | III-A-U | III-B-A | IV-A-U | IV-B-A |
| (a) Density (grams/cc.) | 1.055±0.001 | 1.076±0.001 | 1.055±0.001 | 1.076±0.001 | 1.055±0.001 | 1.070±0.002 | 1.047±0.002 | 1.047±0.002 |
| Percent crystallinity | 0.0 | 35.0 | 0.0 | 35.0 | 0.0 | 23.0 | 0.0 | 0.0 |
| (b) Yield stress (p.s.i.) | 11,500-12,000 | 13,000-13,500 | 11,000-11,500 | (1) | 11,000-11,500 | (1) | 9,700-11,000 | (1) |
| Fail stress (p.s.i.) | 13,500-14,000 | 15,000-15,500 | 13,000-13,500 | 7,000-8,000 | 13,000-13,500 | 7,000-8,000 | 7,200-8,000 | 7,000-8,000 |
| Yield elong. (percent original length) | 6.0 | 6.0 | 6.0 | (2) | 6.0 | (2) | 5.0 | (2) |
| Fail elong. (percent original length) | 50.0 | 40.0 | 50.0 | 4.0 | 50.0 | 4.0 | 5-12 | 4.0 |
| Young's mod. (p.s.i.× $10^5$) | 3.0-5.0 | 4.0-6.0 | 2.8-4.8 | 4.0-5.0 | 2.8-4.8 | 4.0-5.0 | 3.4-4.0 | 4.0-5.0 |
| (c) MIT fold endurance (number of folds) | 500-2,000 | 500-2,800 | 500-1,800 | (3) | 500-1,800 | (3) | 230-1,400 | (3) |
| (d) Dielectric constant | 2.45 | 2.45 | 2.45 | 2.45 | 2.45 | 2.45 | 2.45 | 2.45 |
| Dissipation factor | 0.0003 | 0.0003 | 0.0003 | 0.0003 | 0.0003 | 0.0003 | 0.0003 | 0.0003 |
| (e) Melting point (° C.) | 234 | 234 | 234 | 234 | 234 | 234 | (4) | (4) |
| (f) Solvent resistance (min. to perceptible change) | 5 | 180 | 5 | 180 | 5 | 180 | (5) | (5) |
| (g) Thermal dimensional stability (percent shrinkage) | 80 | <1.0 | 80 | <1.0 | 80 | <1.0 | 80 | <1.0 |

1 Fractures prior to reaching yield point.
2 Fractures prior to reaching same.
3 Fractures immediately.
4 None (amorphous).
5 Completely dissolves within 5 min.

Consideration of the Table I leads to the conclusion that films of isotatic polystyrene which are biaxially stretched and annealed in the manner prescribed by the present invention have outstanding physical characteristics.

Turning first to the density data (*a*) which are reflective of the amount of crystallinity present in the films, it can be noted that those film sections, produced in accordance with the dictates of the present invention, films I–B–A, develop 35% crystallinity and that only two other film sections, films II–B–A and III–B–A, develop any amount of crystallinity at all. Both of the latter, however, fracture prior to reaching the yield point, and in doing so, reflect development of an undesirable amount of brittleness, see particularly (*b*) stress-strain data. By comparison, the featured films, represented by films I–B–A, do not fracture but rather evidence (*b*) stress-strain data greater than that of any of the remaining tested films. From these results, it can be stated: (1) that the defined molecular weights for the isotactic polystyrene constituting the starting film are necessary in order to avoid disorientation leading to embrittling during annealing. In this regard, compare the (*b*) stress-strain data of films I–B–A with that of films II–B–A; and (2) that the presence of as low as 5% of atactic polystyrene in the starting film also leads to embrittled film products leading to the conclusion that its starting film should be constituted essentially of isotactic polystyrene. Again, compare the (*b*) stress-strain data of films I–B–A with that derived from specimens of films III–B–A containing 5% atactic isomer and IV–B–A which is entirely of atactic polystyrene, and also the MIT fold endurance test (*c*) in which the presently featured films maintain their superiority.

In the electrical testing (*d*) dielectric constant and dissipation factor, the featured films show no less than the usual fine performance characteristic of polystyrene.

The melting point data (*e*) indicate that it is not enough for the material to be crystallizable to insure successful biaxially stretched films.

The data resulting from the solvent resistance test (*f*) indicate the superiority of presently featured films over those of the atactic type, as well as the necessity for annealing to attain superiority here.

Thermal stability (shrinkage) results (*g*) indicate that superiority in this property is dependent upon carrying out the prescribed annealing.

The present invention relates to a method for producing biaxially oriented crystalline polystyrene films which are essentially insoluble in common organic solvents under room conditions and which retain their biaxial orientation when subjected to temperature of up to about 200° C. The prescribed method involves simultaneously biaxially stretching a member constituting amorphous isotactic polystyrene having a viscosity average molecular weight of greater than about 200,000 and a number average molecular weight of greater than about 50,000 to the extent of 400–700% of original axis distances at a rate of 2,000–40,000% per minute and under a temperature ranging 115–140° C. and then annealing at a temperature of 175–185° C. for a finite period up to 60 minutes while maintaining biaxial stretched extension.

GENERAL DISCUSSION

*Amorphous isotactic (crystallizable) polystyrene starting material*

Recent work has developed crystallizable polystyrene. One such polystyrene is that termed "isotactic" polystyrene by G. Natta and P. Corradini, Makro. Chemie 16, 77–80 (1955). Another proposed crystallizable polystyrene is "syndiotactic" polystyrene. Crystallizable polystyrene need not contain actual crystallinity as such and in this latter form can be referred to as amorphous crystallizable polystyrene or amorphous isotactic polystyrene. Members or films of this latter, i.e., the amorphous isotactic or amorphous crystallizable form serve as starting materials for the present invention. Once having become crystallized, it can be referred to simply as crystalline polystyrene or crystalline isotactic polystyrene.

Noncrystallizable or atactic polystyrene and crystallizable polystyrene are apparently reflective of their sources and more particularly of the polymerization processes by which they are obtained. Atactic polystyrene is obtained through homogeneous polymerization processes utilizing free radical catalysts as for instance the peroxides including benzoyl peroxide and the like. Crystallizable or crystalline polystyrene and specifically isotactic polystyrene, can be produced by heterogeneous polymerization processes utilizing organometallic-transition metal halide catalysts, for example, a triethylaluminum-titanium tetrachloride catalyst.

The existence of isotactic polystyrene can be established through a number of tests. These tests include appraisal of (*a*) density (absolute density), (*b*) solubility, (*c*) melting point and (*d*) X-ray diffraction analysis, all of which are preferably carried out on a sample of the material which has been first subjected to a particular thermal treatment which is designed to convert all of the isotactic polystyrene present to crystalline form. This is necessary for the reason that some of the tests above and particularly tests, (*a*) density, (*c*) melting point, and (*d*) X-ray, are capable only of distinguishing between crystalline and noncrystalline materials. The atactic polystyrene on the other hand, does not crystallize during the thermal treatment, but rather remains amorphous.

Taking the density test as illustrative; if the density is found to exceed about 1.054 grams/cm.$^3$, the material can be considered as containing crystallinity, it having been determined that the presence of crystalline isotactic polymer is reflected by densities ranging between 1.054–1.124 grams/cm.$^3$. In like manner, the solubilities and the melting points of crystalline isotactic polystyrene will characteristically differ from thermally treated atactic polystyrene which retains its amorphous characteristics.

Representative of thermal treatment which can be carried out prior to taking the above defined measurements, i.e., density, melting point, etc., a sample of the polystyrene to be tested is compression molded and then subjected to a temperature of 175–185° C. for a period of 2 hours. The density of the thermally treated sample is determined by comparing its weight taken in a liquid of known density, such as water, with its weight taken in air. Samples of polystyrene produced in accordance with the process of Example I, after being thermally treated in the described manner, normally exhibit densities of about 1.08 grams/cm.$^3$.

Another test which can be carried out to determine whether a given polystyrene contains isotacticity involves the use of infrared spectrum analysis. A thin specimen of the polystyrene to be tested is prepared by molding or casting from solution. The specimen is then tested in a Perkin-Elmer, Model No. 21, Double Beam Infrared Recording Spectrometer. Atactic polystyrene shows a band at 9.35 microns, whereas isotactic polystyrene exhibits a doublet at about 9.25 microns and 9.45 microns. In addition, the band at 10.6 microns observable in atactic polystyrene is missing in the isotactic isomer. This procedure is capable of determining the existence of crystallizable isotactic polystyrene directly and does not require that the sample be subjected to thermal pretreatment in order to institute crystallinity as in the case of the prior tests such as density, etc. Typical spectra for atactic polystyrene and isotactic polystyrene are shown at FIG. 1. Curve A is indicative of atactic polystyrene of the type produced in Example VI, whereas curve I is that for isotactic polystyrene of the type produced in Example I. Point (*i*) indicates the position of the doublet referred to while point (*a*) indicates the position of the 10.6 micron band.

It is possible to have both atactic and isotactic isomers present in a given mass of polystyrene. However, successful operation of the process of the present invention requires that the films be at least essentially pure isotactic polystyrene. As indicated in the exemplary materials even 5% by weight of the atactic form results in less than satisfactory results. In order to separate the two and obtain an operable or essentially pure isotactic polystyrene fractionating procedures can be followed. One successful procedure for this is by solvent extraction in a Soxhlet extractor using methyl ethyl ketone, the same being carried on for a period of about 20 hours or greater.

The isotactic polystyrene which can be used in practice of the present invention has a (I) viscosity average molecular weight range of greater than about 200,000 and (II) a number average molecular weight of greater than about 50,000.

Viscosity average molecular weight (I) can be determined from measuring the intrinsic viscosity of a solution of polystyrene in o-dichlorobenzene containing 0.2–0.3 part of ditertiary butyl p-cresol at 25.0° C. ±0.02° C. As to the upper limit of viscosity average molecular weight this is best determined in view of the melt viscosity evidenced by the material during extrusion of the film starting material. At molecular weights greater than about 7,000,000 difficulty is encountered in producing satisfactory film. A more preferred range for viscosity average molecular weight is 600,000–5,000,000.

Number average molecular weight (II) is carried out with o-dichlorobenzene as a solvent using the osmotic apparatus and technique set forth in Principles of Polymer Chemistry by Paul J. Flory, published 1953 by the Cornell University Press at pages 275–282. The upper limit of number average molecular weight which can well be accommodated is that of about 1,000,000, with preference in the area lying within the range of 150,000–500,000.

Additionally, the isotactic polystyrene which is preferred in the starting film material for producing the biaxially oriented films of the present invention, is isotactic polystyrene which is essentially amorphous, in other words, it should contain practically no crystallinity, the same being less than the amount of crystallinity indicated by the material having a density of less than about 1.06. Greater than this amount of crystallinity, in the starting films generally leads to fracture or rupture of the films when the same are stretched. In order to determine the amount of crystallinity, the starting film can be subjected to either the previously described density test, or to X-ray diffraction analysis, both of which are sufficiently quantitative as to the amount of crystallinity contained in a given sample. The density test is carried out as previously described.

If it is determined that the isotactic polystyrene film has greater than about 1.06 density, reflecting an excess crystallinity beyond that which is desirable, it is subjected to pretreatment designed to reduce the crystallinity below this critical amount and approaching an amorphous condition. Reduction of crystallinity can be accomplished by subjecting the isotactic polystyrene film to a temperature approaching, and preferably above its melting point, (about 234° C.). Since the orientation process will generally be in the nature of a continuous operation, the thermal pretreatment is incidentally carried out during extrusion of the film from a melt of the isotactic polystyrene. Other conditioning apparatus can, however, be used to perform the same operation on the film itself. If the orientation process is to be postponed in time, the isotactic polystyrene film which is an amorphous state can be maintained in this state by cooling rapidly to a temperature below about 90° C. in air or liquid. Lowering of the temperature in effect freezes the isotactic polystyrene in the induced amorphous state. In the continuous type operation, the proximity of the melt to the stretching step generally eliminates the need for this cooling.

*Preparation of amorphous isotactic polystyrene film (starting material)*

Provision of the crystallizable polystyrene in sheets or films capable of being stretched can best be attained by a double extrusion process. During the first extrusion, the polystyrene is heated to an equilibrium temperature of 285–290° C. and extruded in the form of fine rods, which can have round, square or other convenient cross-sectional configurations. The extruded rods are then directed through a chopper to provide them in short lengths or pellets. Pellets which are in effect 0.125 inch cubes are quite satisfactory. In the second extrusion, the pelletized material is again heated to an equilibrium temperature of 285–290° C. and extruded through a film-die head. This film which results can have any convenient dimensions; note however, that this film, which is the starting film, will eventually be stretch-oriented both longitudinally and transversally in considerable amounts, i.e., on the order of six magnitudes. This should be taken into consideration when choosing the film-die head. The thickness of the film on the other hand will be decreased with stretching. To illustrate, biaxially oriented crystalline polystyrene film 48 inches in width and 15 mils in thickness, can be continuously produced from a starting film 12 inches in width and 150 mils in thickness.

If upon being extruded, the film is to be immediately directed to the stretching operation, a quenching step as such is unnecessary to insure that the crystallizable polystyrene film be amorphous in nature. In this regard however, the film cannot be maintained at greater than 150° C. for a period longer than about 1 minute without crystallization taking place. If the latter does occur, then heating and quenching of the film, in the manner previously discussed, is necessary to provide the crystallizable polystyrene film in amorphous condition.

*Biaxial stretch-orientation operation*

Starting films or members of crystallizable or isotactic polystyrene having the defined characteristics as to amorphousness, purity and molecular weight are subjected to being biaxially stretched to the extent of 400–700% of the original axes distances at a rate of 2,000–40,000% per minute under a temperature of 115–140° C.

When the starting films are stretched less than 400% in either or both directions, the film disorients during the annealing step to follow. Alternatively, attempts to stretch to extents greater than 700% results in the films rupturing or tearing during the stretching operation. The preferred range for extent of stretch is 500–600% of the original or initial axes distances. Regarding the rate of stretching, with rates of less than 2,000% per minute, the resulting orientation which is developed in the film is lost during the annealing operation which follows. Attempts to stretch at rates greater than 40,000% per minute are accompanied by ripping or fracturing of the film. The preferred rate of stretching ranges 10,000–20,000% per minute.

The prescribed stretching temperature lies 5–30° C. above the 2nd order transition temperature, or glassy transition temperature, Tg, for isotactic polystyrene. When compared to other transition temperatures such as melting points, the glassy transition temperature, Tg, occurs over a broader temperature range, or to state it differently, it occurs less sharply generally than the other transition temperatures. Tg for isotactic polystyrene then occurs over about 100–110° C. If stretching of the isotactic polystyrene film is carried out at Tg or the temperature range defining the same, the films tend to cold-draw, or to express it differently, stretching is localized with shouldering down in a confined part of the film, rather than extending over the entire film area which is exposed to the stretching forces. It is this latter, homogeneous type, stretching which is desirable in the present case and which is attained by stretching at 115–140° C. If stretching is carried out at temperatures greater than 140° C., the film does not develop orientation which can be successfully set in the annealing operatoin. In this regard, it bears reminding that orientation and crystallinity are not interchangeable terms. During the biaxial stretching orientation is developed but by contrast crystallinity is not. A preferred temperature for stretching is 120–125° C.

It should be noted that the conditions mentioned above are interdependent and that changes made in one or more of the ranges set forth will require compensation in the remaining conditions, all of course remaining within the limits as designated.

Biaxially stretching can be effected in a single or continuous operation. In piece operation, a lazy-tongs-type cross-stretcher can be used to advantage, whereas in the continuous type operations either tenter-type cross-stretching frames or blow-extrusion techniques can be used. When tenter-frames are used, the differential in speed between the front and rear rollers develops longitudinal stretching while simultaneously the lateral spacing of the frame develops transversal stretching to provide simultaneously biaxially stretch-oriented film.

Annealing stretch-oriented film

The prescribed annealing operation is carried out on the biaxially stretched isotactic polystyrene films maintained at a temperature of 175–185° C. for a finite period of up to 60 minutes. With temperatures outside the prescribed annealing temperature range, less than a desirable amount of crystalline development takes place. The preferred temperature resides at about 180° C. The period for annealing need only be sufficient to insure that the biaxially oriented film will not retract or lose orientation when exposed unsupported to temperatures greater than about 180° C. When annealing times longer than that prescribed are used, usually no additional crystallinity is developed. Rather with extension of the annealing time the possibility of degradation taking place in the films increases.

During annealing, the film is maintained at its biaxially stretched extension through application of biaxial tension. This is particularly important from the standpoint that the previous step of simultaneous biaxial stretching does as such not develop crystallinity in the films. Note, however, that some retraction of the previously initiated biaxial stretching can be accommodated, provided that the end amount of stretch extension lies within the prescribed range for the same.

The annealing step can take place immediately after or contiguous to the biaxial stretching operation, or it can be postponed in time. When postponement is to take place, the films can be conditioned for storage by rapidly quenching to below 90° C. while maintaining biaxial stretched extension. Quenching can be performed by subjecting the same to a liquid bath or a cool-air blast.

Annealing can be effected in an atmosphere heated to the prescribed amount. Satisfactory performance can be had in hot-air circulating ovens located at the after-ends of the stretching apparatuses previously described. In the case of piece operation, the biaxially stretched annealing can be simply performed by retaining the biaxially stretched film in the cross-stretcher under biaxial tension for the time and temperature prescribed for annealing. In the continuous operation, the ovens are provided with differential speed film carrier rollers in order that the film (a) can be maintained under longitudinal tension, while (b) being advanced overall at speeds designed to provide the same with residence, equal to the above-described annealing time, within the annealing oven. The prescribed lateral tension under which the films are to be maintained during annealing is provided for by the inclusion of a constant-width tenter-frame within the oven. In this regard, the tenter-frame can be simply an extension of the tenter-frame used in the stretching operation.

Figure 2:
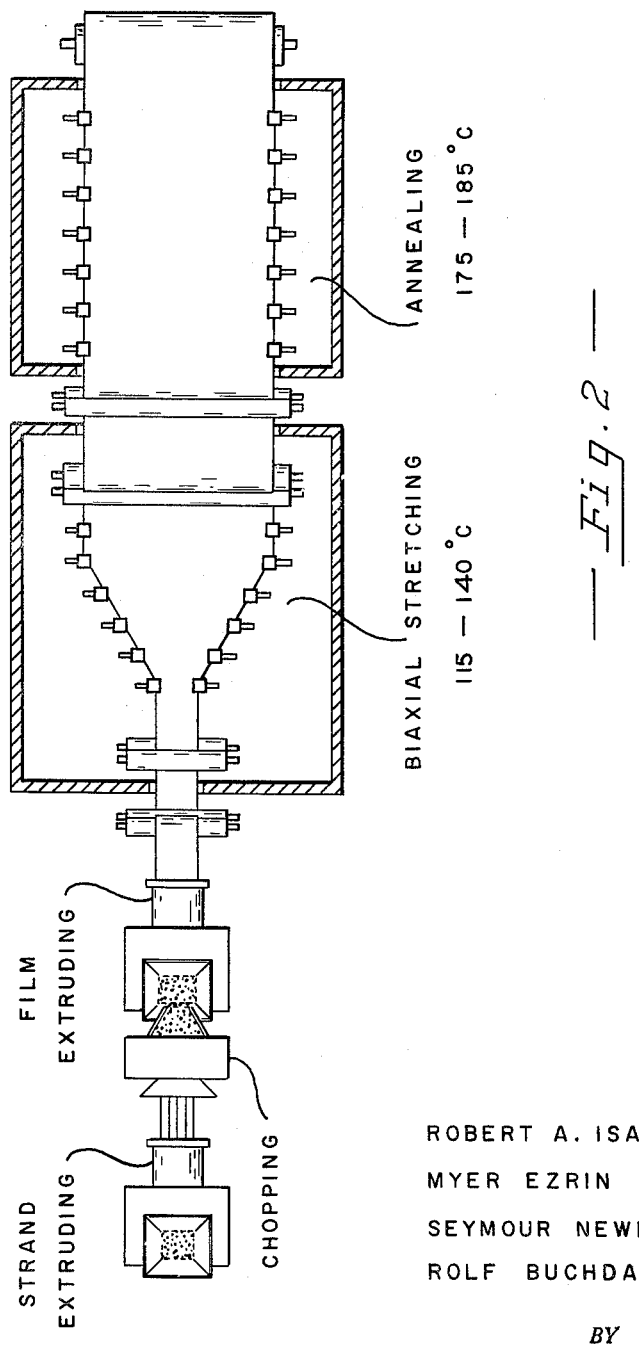

Accompanying FIG. 2 is a diagrammatical top elevation, partly in section, illustrating apparatus and process expedients by which to continuously carry out the preparation, biaxial stretching and annealing steps referred to above and designed to provide biaxially oriented crystalline polystyrene members.

It will thus be seen that the objects set forth above, among those made apparent from the preceding description are efficiently attained, and since certain changes may be made in carrying out the above orientation process and in the resulting polystyrene products without departing from the scope of the invention, it is intended that all material contained in the above description shall be interpreted as illustrative and not in a limiting sense.

What is claimed is:

1. A method for producing biaxially oriented crystalline polystyrene members which are essentially insoluble in common organic solvents under room conditions and retain orientation up to about 200° C. which comprises simultaneously biaxially stretching a starting member constituting amorphous isotactic polystyrene having a viscosity average molecular weight of greater than about 200,000 and a number average molecular weight of greater than about 50,000 to the extent of 400–700% of original axes distances at a rate of 2,000–40,000% per minute and under a temperature ranging 115–140° C., and then annealing the stretched member at a temperature of 175–185° C. for a finite period up to 60 minutes while maintaining biaxial stretched extension therein.

2. The method according to claim 1 wherein the amorphous isotactic polystyrene of the starting member has a viscosity average molecular weight of 600,000–5,000,000.

3. The method according to claim 1 wherein the amorphous isotactic polystyrene of the starting member has a number average molecular weight of 150,000–500,000.

4. The method according to claim 1 wherein the starting member is stretched to the extent of 500–600% of the original axes distance.

5. The method according to claim 1 wherein the rate of said stretching is 10,000–20,000% per minute.

6. The method according to claim 1 wherein the stretching temperature is 120–125° C.

7. The method according to claim 1 wherein annealing is carried out at a temperature of about 180° C.

8. Biaxial oriented crystalline polystyrene members evidencing the properties of (a) essential insolubility in common organic solvents under room conditions, (b) retaining orientation up to about 200° C., (c) having a fail stress of greater than 14,000 p.s.i. and (d) a yield elongation greater than 5.0% of original length.

References Cited in the file of this patent

UNITED STATES PATENTS 2,412,187    Wiley et al. _____ Dec. 3, 1946

FOREIGN PATENTS 538,782    Belgium _____ Oct. 6, 1955

OTHER REFERENCES

Tobolsy: Scientific American, Sept. 1957, pages 121–126, 128, 133, 134. (Copy in Scientific Library.)